(12) United States Patent
Miwa et al.

(10) Patent No.: US 10,300,893 B2
(45) Date of Patent: May 28, 2019

(54) BRAKE BOOSTING DEVICE (71) Applicant: ADVICS CO., LTD., Kariya-shi, Aichi (JP)

(72) Inventors: Yuta Miwa, Nagoya (JP); Tetsuya Honda, Obu (JP)

(73) Assignee: ADVICS CO., LTD., Kariya-Shi, Aichi-Ken (JP)

(*) Notice: Subject to any disclaimer, the term of this patent is extended or adjusted under 35 U.S.C. 154(b) by 57 days.

(21) Appl. No.: 15/315,012

(22) PCT Filed: Jul. 14, 2015

(86) PCT No.: PCT/JP2015/071045
§ 371 (c)(1),
(2) Date: Nov. 30, 2016

(87) PCT Pub. No.: WO2016/010163
PCT Pub. Date: Jan. 21, 2016

(65) Prior Publication Data
US 2017/0190323 A1 Jul. 6, 2017

(30) Foreign Application Priority Data
Jul. 16, 2014 (JP) ................. 2014-145758

(51) Int. Cl.
F16F 9/38 (2006.01)
B60T 7/04 (2006.01)
(Continued)

(52) U.S. Cl.
CPC ...... B60T 7/04 (2013.01); B60T 7/06 (2013.01); B60T 11/18 (2013.01); B60T 17/00 (2013.01);
(Continued)

(58) Field of Classification Search
CPC ..... B60T 7/04; B60T 17/00; F16F 1/02; F16F 9/38
(Continued)

(56) References Cited

U.S. PATENT DOCUMENTS 5,308,091 A * 5/1994 Mihalcin ............. F16J 3/041
277/636
7,314,108 B2 * 1/2008 Kuki .................. B60G 15/068
180/84
(Continued)

FOREIGN PATENT DOCUMENTS

| CN | 101397007 A | 4/2009 |
|----|-------------|--------|
| JP | 2009-236195 A | 10/2009 |

(Continued)

OTHER PUBLICATIONS

International Search Report (PCT/ISA/210) dated Oct. 13, 2015, by the Japanese Patent Office as the International Searching Authority for International Application No. PCT/JP2015/071045.
(Continued)

Primary Examiner — Thomas W Irvin
(74) Attorney, Agent, or Firm — Buchanan Ingersoll & Rooney PC (57) ABSTRACT A brake boosting device wherein a vibration control member is provided to an end part of a return coil spring that is arranged inside a vehicle chamber and that is interposed between a booster body and an input rod. The vibration control member has provided thereto: a seat part that suppresses the vibration of the return coil spring and that is between the end part of the return coil spring and a support part that supports the end part; and a guide part that is provided integrally with the seat part and that fits with the inner periphery of the end part of the return coil spring at a prescribed radial tightening allowance.

10 Claims, 8 Drawing Sheets (51) Int. Cl.
*F16J 3/04* (2006.01)
*F16J 15/52* (2006.01)
*F16F 1/12* (2006.01)
*B60T 17/00* (2006.01)
*F16F 1/02* (2006.01)
*B60T 7/06* (2006.01)
*B60T 11/18* (2006.01)
*B60T 17/22* (2006.01)
*G05G 1/30* (2008.04)

(52) U.S. Cl.
CPC .............. *B60T 17/221* (2013.01); *F16F 1/02* (2013.01); *F16F 1/12* (2013.01); *F16J 3/04* (2013.01); *F16J 3/042* (2013.01); *F16J 15/52* (2013.01); *G05G 1/30* (2013.01)

(58) Field of Classification Search
USPC .......................................... 188/322.12, 352
See application file for complete search history.

(56) References Cited

U.S. PATENT DOCUMENTS

| | | | | |
|---|---|---|---|---|
| 8,418,821 B2* | 4/2013 | Henneberg | ............. | B60G 13/00 |
| | | | | 188/322.12 |
| 8,646,583 B2* | 2/2014 | Imaeda | ..................... | F16F 9/38 |
| | | | | 188/218 A |
| 9,656,644 B2* | 5/2017 | Maruyama | .............. | B60T 7/042 |
| 9,829,114 B2* | 11/2017 | Isono | ................... | F16K 17/0473 |
| 2003/0209395 A1* | 11/2003 | Fukaya | .................. | B60G 11/14 |
| | | | | 188/322.12 |
| 2005/0121860 A1* | 6/2005 | Ota | .......................... | F16J 3/041 |
| | | | | 277/635 |
| 2013/0269338 A1 | 10/2013 | Isono | | |
| 2015/0321652 A1 | 11/2015 | Maruyama et al. | | |
| 2017/0089419 A1* | 3/2017 | Ando | ........................ | F16F 9/38 |
| 2017/0321779 A1* | 11/2017 | Miwa | ........................ | F16F 9/38 |

FOREIGN PATENT DOCUMENTS

| | | |
|---|---|---|
| JP | 2011-133080 A | 7/2011 |
| JP | 2012-41969 A | 3/2012 |
| JP | 2013-227016 A | 11/2013 |
| WO | WO 2013/162022 A1 | 10/2013 |

OTHER PUBLICATIONS

Written Opinion (PCT/ISA/237) dated Oct. 13, 2015, by the Japanese Patent Office as the International Searching Authority for International Application No. PCT/JP2015/071045.

Official Action dated issued by the State Intellectual Property Office of People's Republic of China on Jul. 3, 2018 in corresponding Chinese Patent Application No. 201580037931.1, and an English language translation of the Official Action (10 pages).

* cited by examiner

BRAKE BOOSTING DEVICE

TECHNICAL FIELD

The preset invention relates to a brake boosting device, more particularly to a brake boosting device having a return coil spring between a booster body and an input rod.

BACKGROUND ART

The brake boosting device of this type may be configured to have a return coil spring in a vehicle interior as described in, for example, PTL 1 below.

CITATION LIST

Patent Literature

PTL 1: JP-A-2013-227016

SUMMARY OF INVENTION

Technical Problem

In the brake boosting device described in PTL 1, one end (front end) of a return coil spring is directly engaged with a booster body and the other end (rear end) of the return coil spring is directly engaged with a retainer (assembled to an input rod). Accordingly, when the return coil spring vibrates associated with the operation of the brake boosting device and resonates with the retainer, the booster body, or the like, then abnormal noise caused by this may be propagated to the passenger. Vibrations of the return coil spring are generated by an impact that occurs when the brake pedal stops in the initial position while the pedal is returned.

The invention addresses (prevents the generation of abnormal noise caused by vibrations of the return coil spring) the above problem and is characterized by a brake boosting device, in which a vibration control member is provided in an end part of a return coil spring interposed between a booster body and an input rod, the return coil spring being disposed in a vehicle interior, and the vibration control member is provided with a seat part interposed between the end part of the return coil spring and a support part supporting the end part, the seat part suppressing vibrations of the return coil spring, and a guide part disposed integrally with the seat part, the guide part being fitted to an inner periphery or an outer periphery of the end part of the return coil spring via a predetermined radial tightening allowance.

In embodying the above invention, the guide part may include a cylindrical base part and a plurality of arc-shaped projections provided at regular intervals in a circumferential direction on an outer periphery or an inner periphery of the base part, the plurality of arc-shaped projections being fitted to the inner periphery or the outer periphery of the end part of the return coil spring via a predetermined radial tightening allowance. In such a case, a connection portion between the seat part and the guide part may be provided with an annular recess part capable of housing the end part of the return coil spring. In addition, the vibration control member may be disposed integrally with an end part of a boot disposed between the booster body and the input rod, the end part being close to the booster body. In this case, a support part supporting the end part of the boot close to the booster body may be cylindrical, in the guide part supported by the support part, three or more outer peripheral projections may be provided at regular intervals in the circumferential direction on the outer periphery of the cylindrical base part, three or more inner peripheral projections may be provided at regular intervals in the circumferential direction on the inner periphery of the cylindrical base part, and the outer peripheral projections and the inner peripheral projections may be alternately disposed with a phase difference in the circumferential direction.

In the brake boosting device according to the above invention, the end part of the return coil spring disposed in the vehicle interior is provided with the vibration control member and the vibration control member is provided with the seat part interposed between the end part of the return coil spring and the support part supporting the end part, the seat part suppressing vibrations of the return coil spring, and the guide part disposed integrally with the seat part, the guide part being fitted to the inner periphery or the outer periphery of the end part of the return coil spring via the predetermined radial tightening allowance. Therefore, vibrations of the return coil spring itself can be suppressed by the guide part. In addition, the transfer of vibrations from the return coil spring to the support part can be reduced by the seat part. Accordingly, occurrence of abnormal noise caused by vibrations of the return coil spring can be prevented.

In embodying the above invention, when the connection portion between the seat part and the guide part is provided with the annular recess part capable of housing the end part of the return coil spring, the amount of engagement between the return coil spring and the guide part can be increased as compared with the case in which the recess part is not provided, thereby increasing the vibration suppression effects by the guide part.

In addition, in embodying the above invention, when the vibration control member is disposed integrally with the end part of the boot installed between the booster body and the input rod, the end part being close to the booster body, the number of components can be reduced and simplicity and cost reduction can be achieved as compared with the case in which the vibration control member is configured separately from the boot. In addition, in this case, if the seat part interposed between the end part of the return coil spring and the support part supporting the end part is disposed in the end part of the boot, the sealing performance of the end surface of the boot can be improved.

In addition, in embodying the above invention, when the support part supporting the end part of the boot close to the booster body is cylindrical, the guide part supported by the support part is provided with three or more outer peripheral projections at regular intervals in the circumferential direction on the outer periphery of the cylindrical base part and three or more inner peripheral projections at regular intervals in the circumferential direction on the inner periphery of the cylindrical base part, and the outer peripheral projections and the inner peripheral projections are alternately disposed with a phase difference in the circumferential direction, then the inner peripheral projections can be used to perform the centering of the boot with respect to the support part and the assemblability of the boot to the support part can be improved. In addition, in this case, the inner peripheral projections allow the outer peripheral projection to move radially inward. Therefore, when the return coil spring is tilted as the input rod is tilted, it is possible to suppress an increase (an increase of the surface pressure in the engagement part) in the engagement force of the return coil spring with respect to the guide part. Accordingly, the durability of the guide part can be improved by reducing the wear damage of the guide part caused by the return coil spring.

DESCRIPTION OF EMBODIMENTS

Embodiments of the invention will be described below with reference to the drawings. FIGS. 1 to 6 illustrate a vehicle brake boosting device according to a first embodiment of the invention. This brake boosting device 100 according to the first embodiment has a return coil spring 30 between a booster body 10 and an input rod 20. In addition, a boot 40 is installed between the booster body 10 and the input rod 20.

The booster body 10 is configured so as to be assembled to a dash panel (not illustrated) and a rear end part 10a is disposed in a vehicle interior. The input rod 20 is provided in the booster body 10 so as to be movable forward and backward, coupled to a rear end part 11a of a plunger 11 at a spherical end part 21, and coupled to a middle part 51 of a brake pedal lever 50 at a rear end part 22 so as to be tiltable. The plunger 11 assembled to the booster body 10 so as to be movable forward and backward. In addition, the brake pedal lever 50 is assembled to a pedal bracket 59 so as to be tiltable in a front-rear direction at an upper end part 52, and a brake pedal 54 is assembled integrally with a lower end part 53.

The return coil spring 30 is disposed in the vehicle interior, engaged with the booster body 10 via a seat part 41 of the boot 40 at a front end part 31, and engaged with a retainer 28 via an annular vibration control material 29 at a rear end part 32. The retainer 28 is formed in a disc shape and assembled integrally with the middle part of the input rod 20 at the inner periphery part. The vibration control material 29 includes an annular seat part 29a, interposed between the rear end part 32 of the return coil spring 30 and the retainer 28, that suppresses vibrations of the return coil spring 30 and a cylindrical guide part 29b, disposed integrally with the seat part 29a, that is engaged with the inner periphery of the rear end part of the return coil spring 30 via a predetermined radial tightening allowance. The inner periphery of the guide part 29b is provided with inner peripheral projections (configured as in inner peripheral projections 42b described later) to be elastically engaged with the outer periphery of the retainer 28 and the outer periphery of the guide part 29b is provided with outer peripheral projections (configured as in outer peripheral projections 42c described later) to be fitted to the inner periphery of the rear end part of the return coil spring 30 via a predetermined radial tightening allowance.

The boot 40 covers and protects the outer periphery of the plunger 11 and formed in a cylindrical shape using an elastic member such as rubber, the seat part 41 and a guide part 42 are integrally formed in the front end part to be assembled to a cylindrical support part 10a1 formed in the rear end part 10a of the booster body 10, and an annular mounting part 43 is formed integrally with the rear end part to be assembled to a neck part 23 of the input rod 20. The seat part 41 and the guide part 42 constitute a vibration control member A provided in the front end part 31 of the return coil spring 30, the seat part 41 extends radially outward at the front end of the guide part 42 and is formed in a circular shape, and the guide part 42 is formed in a cylindrical shape.

In addition, the seat part 41 is interposed in the front-rear direction between the front end part 31 of the return coil spring 30 and the cylindrical support part 10a1 supporting the front end part 31 and functions to suppress vibrations of the return coil spring 30. In contrast, the guide part 42 is fitted to the inner periphery of the front end part 31 of the return coil spring 30 via a predetermined radial tightening allowance and has the function of suppressing lateral vibrations (vibrations in the up-down direction in the drawing) of the return coil spring 30.

By the way, in the embodiment, the guide part 42 includes a cylindrical base part 42a, the four inner peripheral projections 42b provided in the circumferential direction at regular intervals (at intervals of 90 degrees) on the inner periphery of the cylindrical base part 42a, the four outer peripheral projections 42c provided in the circumferential direction at regular intervals (at intervals of 90 degrees) on the outer periphery of the cylindrical base part 42a. The outer peripheral projections 42c and the inner peripheral projections 42b are alternately disposed with a phase difference (a phase difference of 45 degrees) in the circumferential direction (see FIG. 5). The inner peripheral projections 42b have a predetermined length in the axial direction, have a semispherical cross section, and are elastically engaged with the outer periphery of the cylindrical support part 10a1 of the booster body 10 at an end (inner end). The outer peripheral projections 42c have a necessary length in the axial direction (longer than the length in the axial direction of the inner peripheral projections 42b), have an arc-shaped cross section, and elastically engaged with the inner periphery of the front end part 31 of the return coil spring 30 at an end (outer end).

In the brake boosting device 100 according to the first embodiment configured as described above, the vibration control member A is provided so as to correspond to the front end part 31 of the return coil spring 30 disposed in the vehicle interior and the vibration control member A is provided with the seat part 41, interposed between the front end part 31 of the return coil spring 30 and a cylindrical support part 11a1 supporting the front end part 31, that suppresses vibrations of the return coil spring 30 and the guide part 42, disposed integrally with the seat part 41, that is fitted to the inner periphery of the front end part of the return coil spring 30 via a predetermined radial tightening allowance. Therefore, the vibrations of the front end part 31 itself in the return coil spring 30 can be suppressed by the guide part 42. In addition, transfer of vibrations from the front end part 31 of the return coil spring 30 to the rear end part 10a of the booster body 10 can be reduced by the seat part 41. In addition, since the vibration control material 29 is provided so as to correspond to the rear end part 32 of the return coil spring 30, the same effects as in the above vibration control member A can also be obtained by the vibration control material 29. Accordingly, occurrence of abnormal noise caused by vibrations of the return coil spring 30 can be prevented.

In addition, in the brake boosting device 100 according to the first embodiment, the vibration control member A is disposed integrally with the end part of the boot 40 installed between the booster body 10 and the input rod 20, the end part being close to the booster body. Therefore, the number of components can be reduced and simplicity and cost reduction can be achieved as compared with the case in which the vibration control member A is configured separately from the boot 40. In addition, in the first embodiment, since the seat part 41 of the vibration control member A is provided in the front end part of the boot 40, the sealing performance of the front end surface of the boot can be improved.

In addition, in the brake boosting device 100 according to the above first embodiment, the support part 10a1 supporting the end part (front end part) of the boot 40 close to the booster body is formed in a cylindrical shape, the guide part 42 supported by the support part 10a1 is provided with the four outer peripheral projections 42c provided at regular intervals in the circumferential direction on the outer periphery of the cylindrical base part 42a and the four inner peripheral projections 42b provided at regular intervals in the circumferential direction on the inner periphery of the cylindrical base part 42a, and the outer peripheral projections 42c and the inner peripheral projections 42b are alternately disposed with a phase difference in the circumferential direction.

Therefore, the centering of the boot 40 with respect to the support part 10a1 (the booster body 10) can be performed using the inner peripheral projections 42b and the assemblability of the boot 40 to the support part 10a1 can be improved. In addition, in the embodiment, the inner peripheral projections 42b allow the outer peripheral projections 42c to move radially inward. Therefore, when the return coil spring 30 is tilted as the input rod 20 is tilted (the case illustrated in FIG. 6), it is possible to suppress an increase (an increase in the surface pressure in the engagement part) in the engagement force of the return coil spring 30 with respect to the guide part 42. Accordingly, the durability of the guide part 42 can be improved by reducing the wear damage of the guide part 42 caused by the return coil spring 30.

Figure 6:
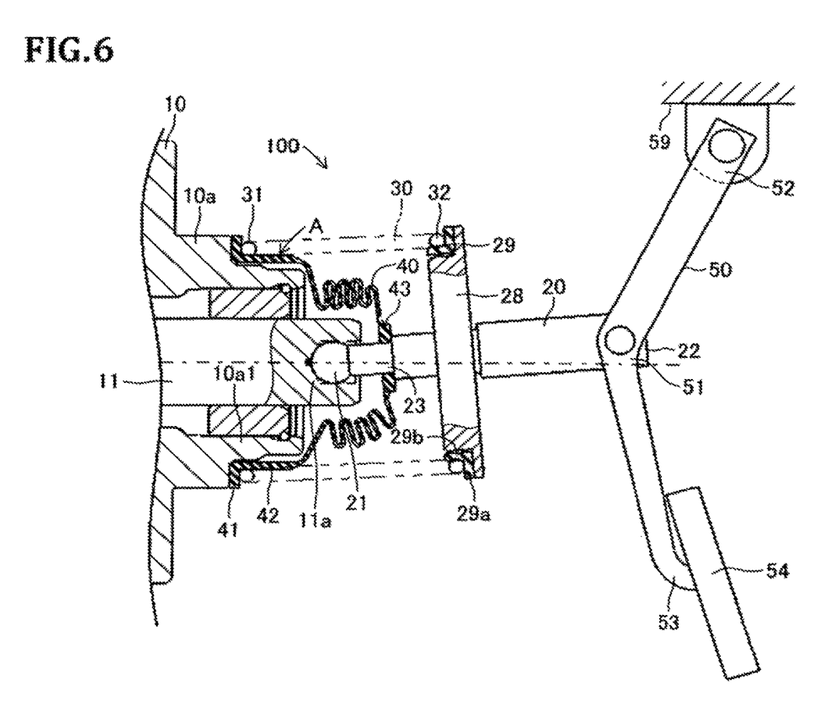
FIG. 6 is a vertical partial cross sectional side view illustrating the first embodiment in FIG. 1 in an operation state.
Figure 7:
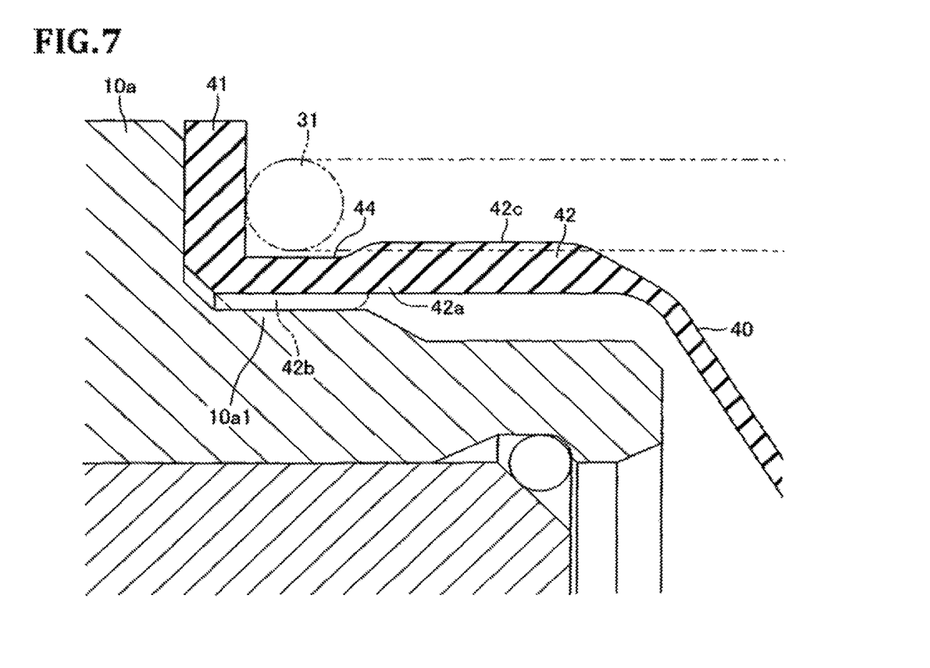
FIG. 7 is an enlarged cross sectional view illustrating the main part of a brake boosting device according to a second embodiment of the invention.

Although the four inner peripheral projections 42b and the four outer peripheral projections 42c of the guide part 42 are provided in the first embodiment above, the number of the inner peripheral projections 42b and the number of the four outer peripheral projections 42c may be changed as appropriate as long as they are three or more. In addition, in the first embodiment described above, since the input rod 20 is tilted as illustrated in FIG. 6 when the brake pedal 54 is depressed, an annular recess part (recessed groove) 44 for housing the end of the return coil spring 30 may be provided in the connection portion between the seat part 41 and the guide part 42 as in a second embodiment illustrated in FIG. 7. In this case, as compared with the first embodiment described above, the amount of engagement (in the radial direction) between the front end part 31 of the return coil spring 30 and the guide part 42 can be increased, vibration suppression effects by the guide part 42 can be increased, it is possible to suppress an increase (an increase of the surface pressure in the engagement part) in the engagement force of the return coil spring 30 with respect to the guide part 42 when the return coil spring 30 is tilted as the input rod 20 is tilted (the case illustrated in FIG. 6), and the durability of the guide part 42 can be improved.

Figure 8:
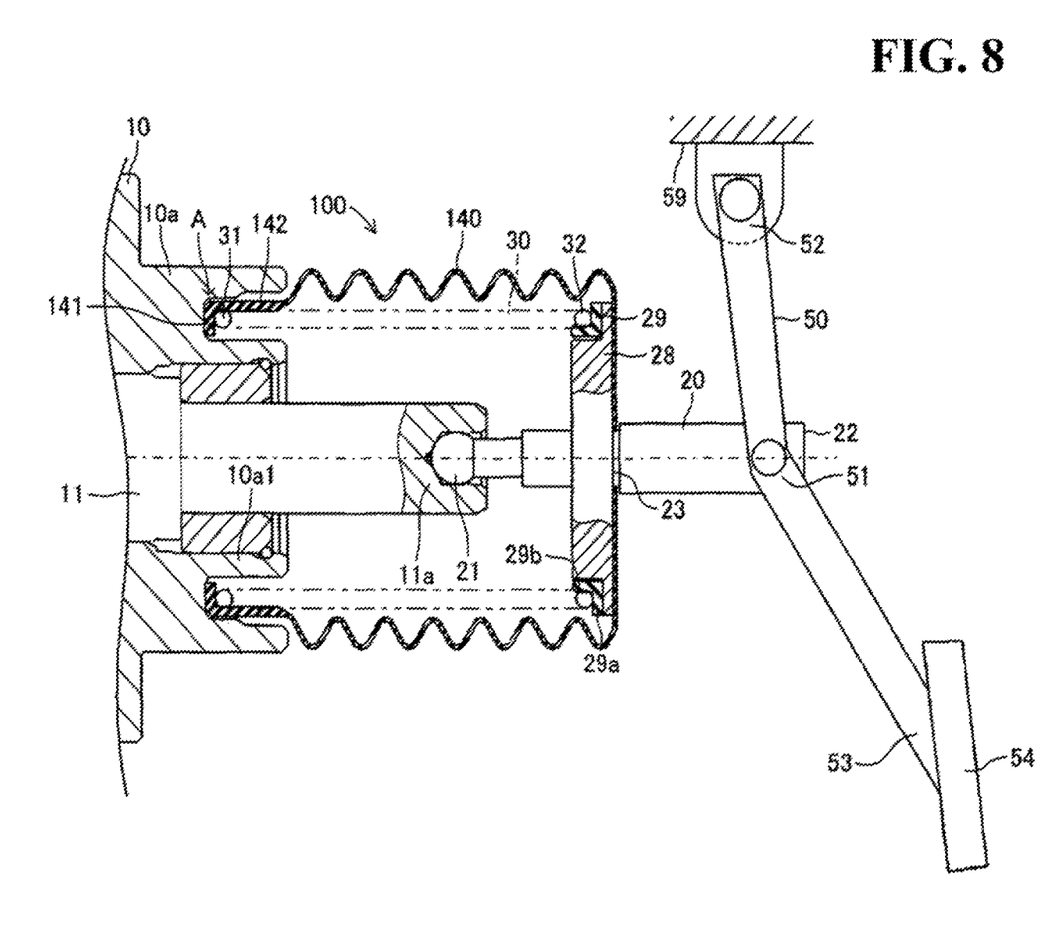
FIG. 8 is a vertical partial cross sectional side view illustrating a brake boosting device according to a third embodiment of the invention.

In addition, in the first embodiment described above, although the invention is embodied to have a structure in which the seat part 41 and the guide part 42 are included in the vibration control member A provided so as to correspond to the front end part 31 of the return coil spring 30 disposed in the vehicle interior, the invention may be embodied to have a structure in which a seat part 141 and a guide part 142 are included in the vibration control member A as in a third embodiment illustrated in FIG. 8. The seat part 141 extends radially inward at the front end of the guide part 142 and is interposed in the front-rear direction between the front end part 31 of the return coil spring 30 and the cylindrical support part 10a1 supporting the front end part 31. In contrast, the guide part 142 is fitted to the outer periphery of the front end part 31 of the return coil spring 30 via a predetermined radial tightening allowance and the inner periphery is provided with the inner peripheral projections (having a similar function as in the outer peripheral projections 42c) elastically engaged with the outer periphery of the front end part 31 of the return coil spring 30 at the end (inner end), and the outer periphery is provided with the outer peripheral projections (having a similar function as the inner peripheral projections 42b) elastically engaged with the inner periphery of the cylindrical support part 10a1 of the booster body 10 at the end (outer end).

Figure 1:
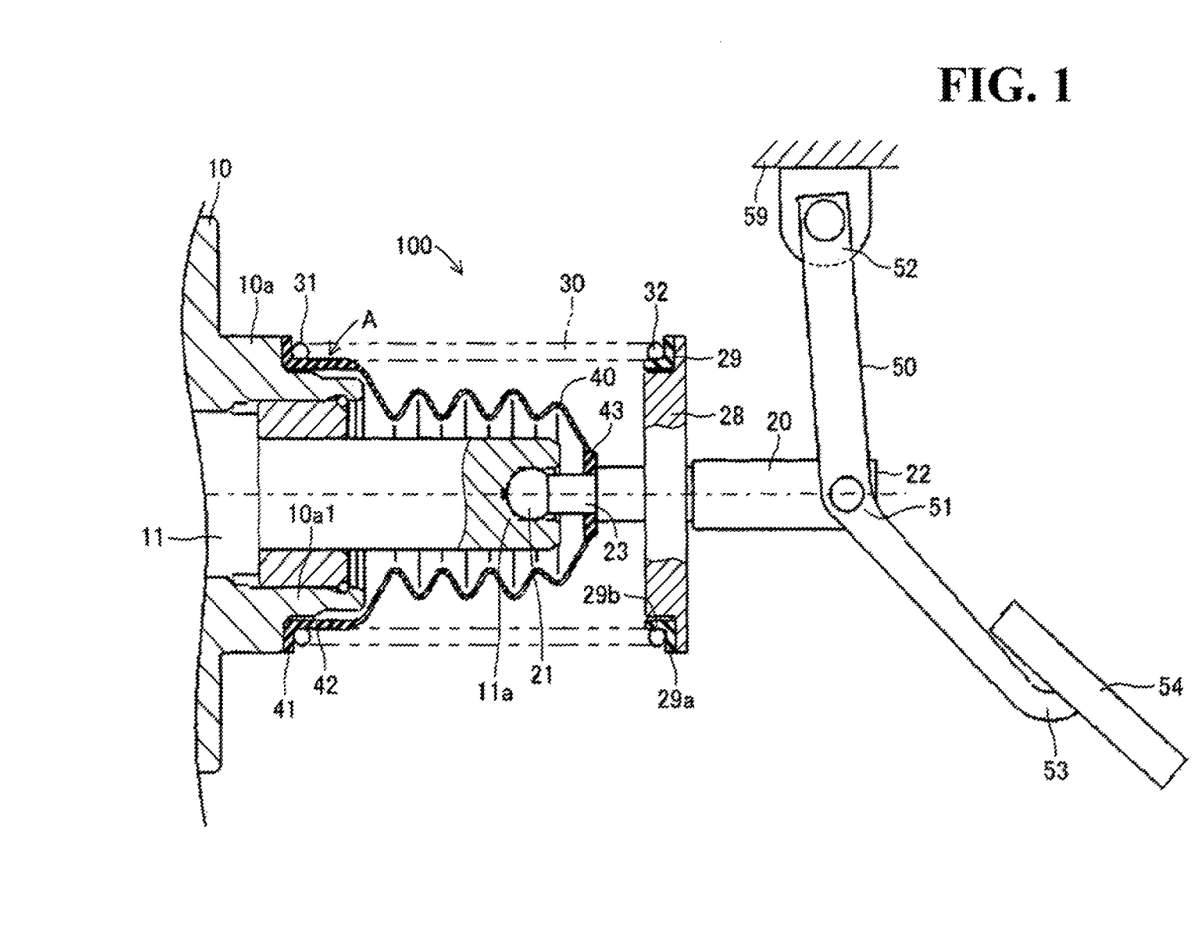
FIG. 1 is a vertical partial cross sectional side view illustrating a brake boosting device in a non-operation state according to a first embodiment of the invention.
Figure 2:
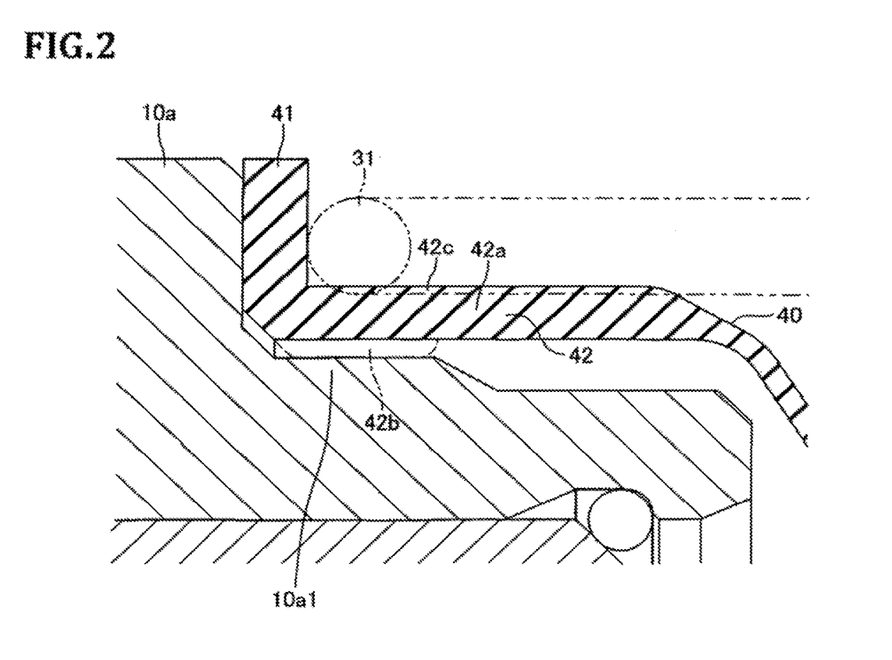
FIG. 2 is an enlarged cross sectional view illustrating the main part of FIG. 1.
Figure 3:
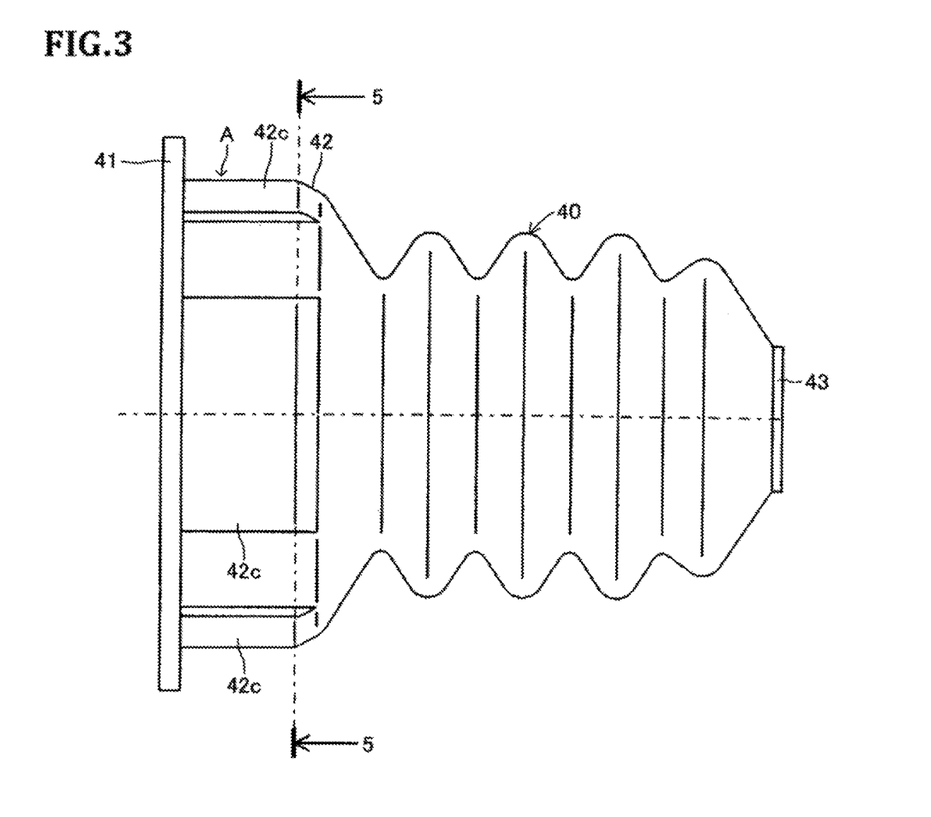
FIG. 3 is a side view illustrating only the boot in FIG. 1.
Figure 4:
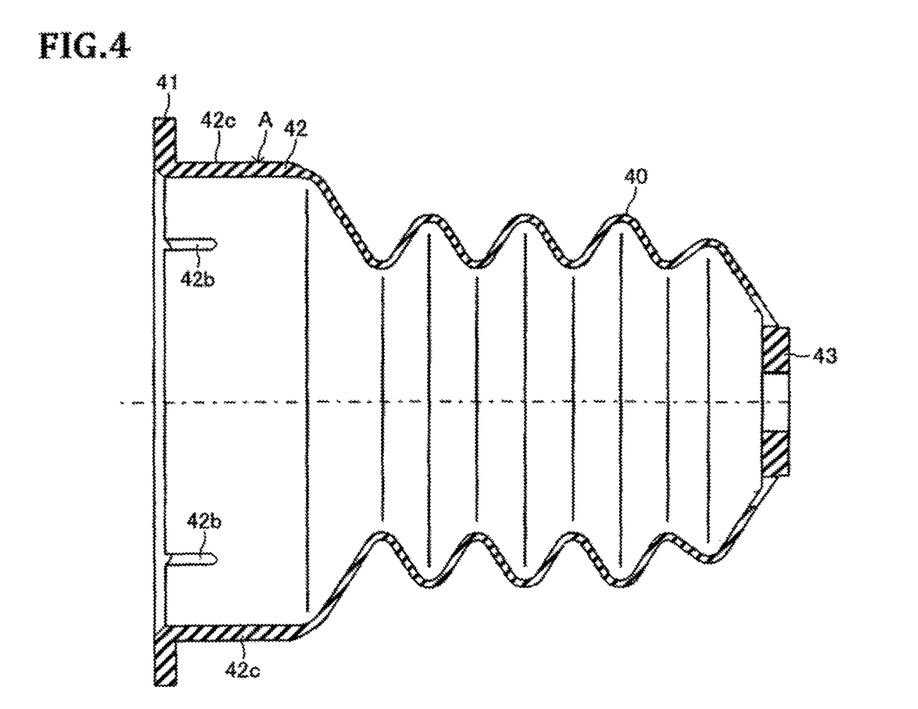
FIG. 4 is a vertical cross sectional side view illustrating only the boot in FIG. 3.
Figure 5:
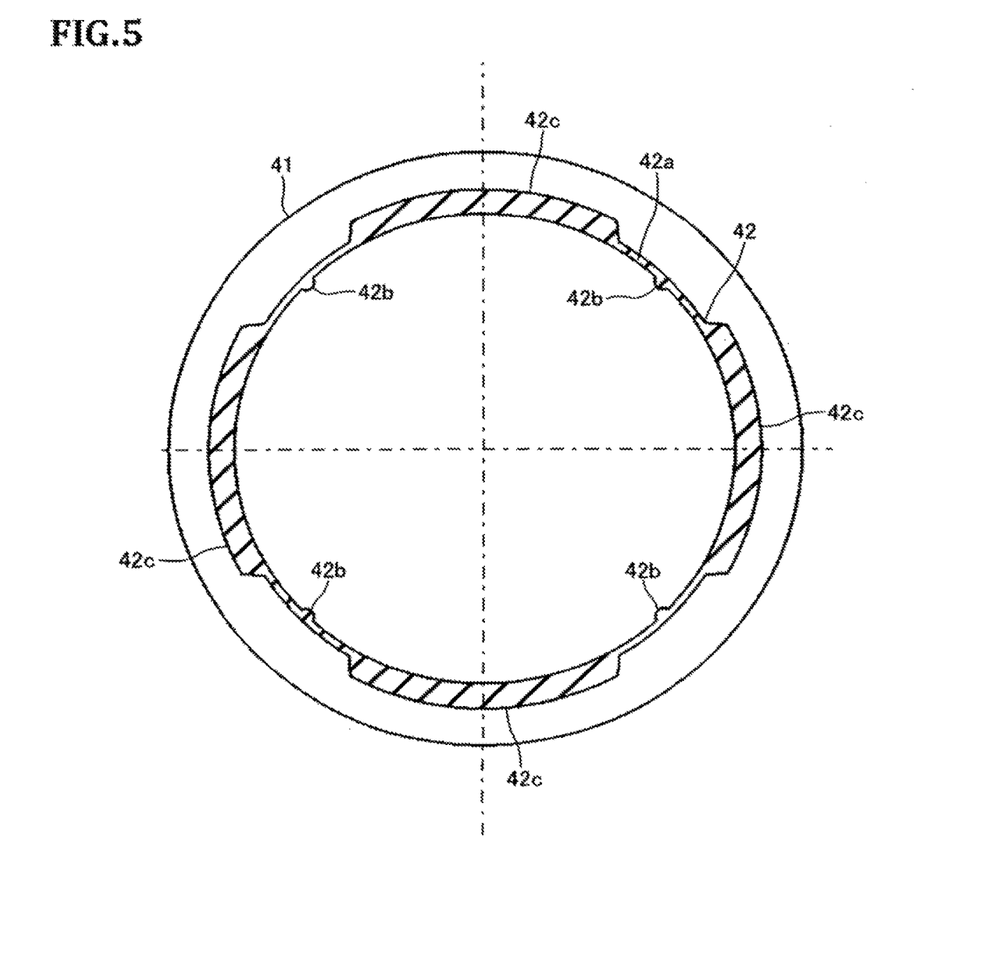
FIG. 5 is a cross sectional view taken along line 5-5 in FIG. 3.

Although the vibration control member A is disposed integrally with the end part of the boot 40 (close to the booster body) installed between the booster body 10 and the input rod 20 in the above embodiments, the invention may be embodied so that the vibration control member A is provided separately from the boot 40 as in, for example, the vibration control material 29 illustrated in FIG. 1.

The invention claimed is:

1. A brake boosting device,
wherein a vibration control member is provided at an end part of a return coil spring interposed between a booster body and an input rod, the return coil spring being disposed in a vehicle interior,
the vibration control member is provided with a seat part interposed between the end part of the return coil spring and a support part supporting the end part, the seat part suppressing vibrations of the return coil spring, and a guide part disposed integrally with the seat part, the guide part being fitted to an inner periphery or an outer periphery of the end part of the return coil spring via a predetermined radial tightening allowance,
the vibration control member being integral with a first end part of a boot, the boot extending in an axial direction and being disposed between the booster body and the input rod, the first end part of the boot being closer to the booster body than to the input rod, the boot including a second end part at an end of the boot opposite the first end part, the boot also including a bellows part positioned between the first end part and the second end part of the boot,
the first end part of the boot comprising a guide part, the guide part of the first end part of the boot comprising a cylindrical base part and a plurality of projections, the cylindrical base part being supported on the support part which is a cylindrical support part of the booster body, the cylindrical base part possessing an outer periphery and an inner periphery, the plurality of projections being provided on the cylindrical base part that is supported on the cylindrical support part of the booster body, the plurality of projections extending in the axial direction and being spaced apart from one another in a circumferential direction of the cylindrical base part, the plurality of projections being located on the inner peripheral surface of the cylindrical base part or the outer peripheral surface of the cylindrical base part, and the plurality of projections including three or more outer peripheral projections provided at regular intervals in the circumferential direction on the outer periphery of the cylindrical base part and three or more inner peripheral projections provided at regular intervals in the circumferential direction on the inner periphery of the cylindrical base part, and the outer peripheral projections and the inner peripheral projections are alternately disposed with a phase difference in the circumferential direction.

2. The brake boosting device according to claim 1, wherein the plurality of projections are arc-shaped projections, the plurality of arc-shaped projections being fitted to the inner periphery or the outer periphery of the end part of the return coil spring via the predetermined radial tightening allowance.

3. The brake boosting device according to claim 2, wherein a connection portion between the seat part and the guide part is provided with an annular recess part in which is positioned the end part of the return coil spring.

4. The brake boosting device according to claim 1, wherein a connection portion between the seat part and the guide part is provided with an annular recess part configured to house the end part of the return coil spring.

5. The brake boosting device according to claim 1, wherein the outer peripheral projections are fitted into the inner periphery of the end part of the return coil spring via the predetermined radial tightening allowance.

6. The brake boosting device according to claim 1, wherein the inner peripheral projections elastically engage an outer periphery of the cylindrical support part of the booster body.

7. A brake boosting device for a vehicle comprising
a booster body that includes a cylindrical support part, an input rod operatively connected to the booster body, a spring retainer connected to the input rod, a boot extending in an axial direction between the booster body and the input rod, a return coil spring disposed in an interior of the vehicle and including first and second end parts, a first vibration control member, and a second vibration control member;

the first vibration control member being made of vibration control material and comprising a seat part to suppress vibration of the return coil spring and a guide part disposed integrally with the seat part, the guide part being fitted to an inner periphery or an outer periphery of the end part of the return coil spring via a predetermined radial tightening allowance;

the second vibration control member being an end part of the boot, the end part of the boot constituting the second vibration control member comprising a seat part and a guide part integral with one another, the seat part of the second vibration control member being interposed between the second end part of the return coil spring and an end part of the booster body, the guide part of the second vibration control member comprising a cylindrical base part that is supported on the cylindrical support part of the booster body; and the guide part of the second vibration control member comprising at least three outer peripheral projections provided at regular intervals in a circumferential direction on an outer periphery of the cylindrical base part and at least three inner peripheral projections provided at regular intervals in the circumferential direction on an inner periphery of the cylindrical base part, and the outer peripheral projections and the inner circumferential direction.

8. The brake boosting device according to claim 7, wherein the inner peripheral projections elastically engage an outer periphery of the cylindrical support part of the booster body.

9. The brake boosting device according to claim 7, wherein the outer peripheral projections elastically engage an inner periphery of the second end part of the return spring.

10. The brake boosting device according to claim 7, further comprising a connection portion between the seat part and the guide part of the second vibration control member, the connection portion including an annular recess in which is positioned the second end part of the return coil spring.

* * * * *